United States Patent [19]
Maucher

[11] Patent Number: 5,634,541
[45] Date of Patent: Jun. 3, 1997

[54] AUTOMATICALLY ADJUSTABLE FRICTION CLUTCH

[75] Inventor: Paul Maucher, Sasbach, Germany

[73] Assignee: LuK Lamellen und Kupplungsbau GmbH, Bühl, Germany

[21] Appl. No.: 26,588

[22] Filed: Mar. 5, 1993

[30] Foreign Application Priority Data

| Mar. 5, 1992 | [DE] | Germany | 42 06 904.1 |
| Mar. 10, 1992 | [DE] | Germany | 42 07 528.9 |
| Apr. 18, 1992 | [DE] | Germany | 42 12 940.0 |

[51] Int. Cl.⁶ .................................................. F16D 13/75
[52] U.S. Cl. .................................. 192/70.25; 192/111 A
[58] Field of Search ........................... 192/70.25, 111 A

[56] References Cited

U.S. PATENT DOCUMENTS

| 2,251,366 | 8/1941 | Miller et al. | 192/70.25 X |
| 2,251,367 | 8/1941 | Miller | 192/70.25 X |
| 2,678,120 | 5/1954 | Binder | 192/111 A |
| 2,703,164 | 3/1955 | Binder | 192/111 A |
| 4,848,554 | 7/1989 | Fukaya | 192/70.25 |
| 4,924,991 | 5/1990 | Takeuchi | 192/111 A |
| 5,069,322 | 12/1991 | Mizukami et al. | 192/70.25 |
| 5,186,298 | 2/1993 | Takeuchi | 192/111 A |

FOREIGN PATENT DOCUMENTS

| 2599446 | 12/1987 | France | 192/111 A |
| 850844 | 9/1952 | Germany | 192/111 A |
| 2920932 | 2/1983 | Germany. | |
| 3518781 | 11/1986 | Germany. | |
| 3631863 | 3/1988 | Germany. | |
| 0134318 | 6/1991 | Japan | 192/111 A |
| 1239432 | 6/1986 | U.S.S.R. | 192/70.25 |
| 2019957 | 11/1979 | United Kingdom | 192/111 A |

*Primary Examiner*—Rodney H. Bonck
*Attorney, Agent, or Firm*—Darby & Darby

[57] ABSTRACT

A friction clutch wherein the wear upon the friction linings of the clutch disc is automatically compensated for in response to each disengagement and subsequent engagement of the clutch whenever an adjustment for wear is necessary. The compensating unit is mounted between the axially movable pressure plate and the diaphragm spring of the friction clutch, and the extent of axial adjustability of the pressure plate to compensate for wear upon the friction linings is determined by an arresting unit having one or more sensors carried by the pressure plate and cooperating with the counterpressure plate and/or with the cover of the friction clutch. The compensating unit comprises a ring-shaped locating element which is biased by the diaphragm spring toward the pressure plate, and two sets of wedges having abutting ramps which can shift the pressure plate and the locating element axially relative to one another in response to angular movement of one set of wedges relative to the other set.

45 Claims, 5 Drawing Sheets

AUTOMATICALLY ADJUSTABLE FRICTION CLUTCH

CROSS-REFERENCE TO RELATED CASES

The friction clutch of the present invention constitutes an improvement over and a further development of friction clutches which are disclosed in commonly owned copending patent applications Ser. No. 07/982,178, now abandoned, (by Paul Maucher) and Ser. No. 07/982,184, now U.S. Pat. No. 5,409,091, (by Wolfgang Reik et al.) filed Nov. 25, 1992.

BACKGROUND OF THE INVENTION

The invention relates to friction clutches, and more particularly to improvements in friction clutches which are automatically adjustable to compensate for wear upon their pressure plates and/or friction linings.

A friction clutch of the character normally employed in motor vehicles to transmit torque between the combustion engine and the driven wheels, particularly between the output element of the engine and the input element of a variable-speed transmission, normally comprises a pressure plate which is axially movably coupled to a cover or housing. The cover is affixed to a counterpressure plate (such as a flywheel) which receives torque from the engine, and a spring (such as a diaphragm spring) is installed between the cover and the pressure plate to urge the pressure plate against one friction lining on a clutch disc or clutch plate serving to transmit torque to the input element of the transmission. Another friction lining bears against the counterpressure plate when the clutch is engaged. Disengagement of the clutch involves axial movement of the pressure plate axially and away from the counterpressure plate, and the friction linings. The friction linings are subject to wear as a result of repeated engagement and disengagement of the friction clutch.

Presently known proposals to compensate for wear upon the friction linings of a friction clutch are disclosed, for example, in German Pat. No. 29 20 932 and in published German patent application Serial No. 35 18 781. Thus, an axially movable adjusting device is installed between the diaphragm spring and the pressure plate. The actual axial adjustment is or can be effected by wedges which bear against the pressure plate and can move the adjusting device toward the diaphragm spring in response to angular displacement of the adjusting device relative to the pressure plate. It was also proposed to change the positions of the wedges for the purpose of moving the adjusting device relative to the pressure plate.

The means for ascertaining the extent of wear upon the friction linings in conventional friction clutches of the above outlined character comprises a plurality of sensors which operate between the pressure plate and the counterpressure plate (normally a flywheel) or between the pressure plate and the cover. When the clutch is engaged, the sensors are displaced in dependency on the extent of wear upon the friction linings, and the extent of movement of the pressure plate away from the counterpressure plate in response to disengagement of the clutch is altered in dependency on the extent of adjustment of the sensors. The operation of conventional automatic wear compensating systems is based on the assumption that, when the friction clutch is new, the disengagement involves a movement of the pressure plate (away from the counterpressure plate) which exactly matches the extent of movement of the diaphragm spring.

When the friction linings undergo a certain amount of wear, the pressure plate moves toward the counterpressure plate (flywheel) to an extent which is dependent on the extent of wear. Therefore, in the absence of any undertakings to the contrary, the diaphragm spring is then required to cover a greater distance from the cover toward the counterpressure plate in order to bias the pressure plate against the adjacent friction lining, i.e., to clamp the friction linings of the clutch disc between the pressure plate and the counterpressure plate. In other words, the distance which is covered by the diaphragm spring then exceeds the distance covered by the pressure plate. This results in appropriate axial displacement of the adjusting device in a direction toward the diaphragm spring.

A drawback of the conventional proposals is that the adjustment does not always correspond to the extent of wear upon the friction linings. The reason is that the extent of movement of the diaphragm spring in response to engagement or disengagement of the friction clutch fluctuates within a certain range, even if the extent of movement to disengage or engage the friction clutch is constant. The bearing which forms part of the disengaging means and serves to displace the customary prongs of the diaphragm spring during disengagement of the friction clutch is particularly likely to perform movements which depart from the expected or prescribed movements within a rather wide range. Furthermore, when the clutch disengaging mechanism (e.g., a mechanical disengaging system) is adjusted, its actual adjustment is likely to depart from an optimal adjustment, for example, because the clearance between the disengaging system and the diaphragm spring is too small and/or because the initially selected stress between the disengaging system and the diaphragm spring is too pronounced. This results in the establishment of operating points which depart from the optimal operating point of the friction clutch.

If a friction clutch is equipped with an automatically adjustable disengaging system e.g., a hydraulic system which employs a master cylinder and a slave cylinder, the aforediscussed means which is to compensate for wear upon the friction linings cannot be operated at all because the extent of movement to disengage the friction clutch is the same during the entire useful life of the clutch. Thus, no adjustment will take place as long as the movement of the diaphragm spring in the region of the adjusting device during disengagement of the friction clutch is less than or at most matches the extent of movement of the pressure plate. On the other hand, if the extent of movement of the diaphragm spring exceeds the extent of movement of the pressure plate, the adjusting device is actuated and carries out an adjustment during each disengagement of the friction clutch irrespective of the extent of wear (or any wear) upon the friction linings so that the friction clutch is totally misadjusted after a relatively small number of disengagements.

An additional problem which arises in conventional self-adjusting friction clutches (i.e., in clutches wherein the relative positions of the pressure plate and the diaphragm spring are to be automatically changed as the wear upon the friction linings progresses) is that the pressure plate is likely to become disengaged from the diaphragm spring in the axial direction of the clutch in response to characteristic resonant vibrations. This results in activation of the adjusting device which induces a total misadjustment of the friction clutch and renders it useless for the intended purpose.

OBJECTS OF THE INVENTION

An object of the invention is to provide a friction clutch with a novel and improved system which automatically compensates for wear upon the pressure plates, upon the diaphragm spring, upon the cover or housing and/or upon the clutch disc or clutch plate.

Another object of the invention is to provide a friction clutch wherein the system which compensates for wear upon the friction linings of the clutch disc and, if necessary, for wear upon certain other parts can be operated in a simple, reliable and highly accurate manner.

A further object of the invention is to provide a simple and compact compensating system which occupies little room in a friction clutch.

An additional object of the invention is to provide a compensating system which can be installed in existing friction clutches.

Still another object of the invention is to provide the compensating system with novel and improved means for preventing excessive adjustments which would result in overcompensation for wear upon the friction linings.

A further object of the invention is to provide a compensating system which comprises a relatively small number of simple parts and whose accuracy and reliability do not diminish during the entire useful life of the friction clutch.

SUMMARY OF THE INVENTION

One feature of the present invention resides in the provision of an engageable and disengageable friction clutch, particularly for vehicles, which comprises a housing or cover rotatable about a predetermined axis, a pressure plate, means (such as an arrangement of leaf springs) for non-rotatably connecting the pressure plate to the housing with limited freedom of movement in the direction of the predetermined axis, a rotary counterpressure plate (such as a flywheel) adjacent the pressure plate, a torque transmitting clutch disc disposed between the two plates and having friction linings engageable by and disengageable from at least one of the plates and being subject to wear as a result of repeated engagement with and disengagement from the at least one plate, at least one actuating device and a resilient device disposed between the housing and the pressure plate to bias the pressure plate toward the counterpressure plate and to thereby clamp the friction linings between the plates and to rotate the clutch disc about the predetermined axis in response to rotation of the plates and housing, and means for compensating for wear at least upon the friction linings. The compensating means is disposed between the pressure plate and one of the aforementioned devices and is movable in the direction of the predetermined axis to a position depending upon the extent of wear upon the friction linings, and the friction clutch further comprises means for arresting the compensating means in the aforementioned position depending upon the extent of wear upon the friction linings. The arresting means is provided on the pressure plate.

The resilient device can comprise an axially stressed diaphragm spring, and the housing can comprise or carry a ring-shaped seat which tiltably mounts the diaphragm spring. The latter preferably includes an annular portion (which can be called the main portion of the diaphragm spring) engaging the seat, and prongs extending substantially radially inwardly of the annular portion and preferably forming part of the actuating device.

The arresting means can comprise at least one sensor having means for monitoring the extent of wear upon the friction linings, and such monitoring means can comprise a sensor element which is movable relative to the pressure plate into abutment with at least one axially fixed part of the friction clutch (the axially fixed parts include one of the two plates and the housing) to thereby limit the extent of movability of the pressure plate away from the counterpressure plate. The sensor element is preferably movable relative to the pressure plate in the direction of the predetermined axis, and the arresting means preferably further comprises means for automatically coupling the sensor element to an axially movable part of the clutch (the axially movable parts include the diaphragm spring and the pressure plate). The arrangement is or can be such that the sensor element comes to a halt upon abutment against the at least one axially fixed part (e.g., one of the plates) of the friction clutch. The at least one axially fixed part can constitute the housing or the counterpressure plate, and the at least one axially movable part can constitute the pressure plate. The sensor element can include a portion which cooperates with a portion of a locating element of the compensating means in response to disengagement of the friction clutch. Such locating element is movable in the direction of the predetermined axis, and the friction clutch preferably further comprises means for movably mounting the locating element on the pressure plate.

Stated in a different way, the compensating means of the improved friction clutch can comprise a locating element for the resilient device, and such compensating means preferably further comprises an equalizing unit which is disposed between the locating element and the pressure plate. The equalizing unit is self-locking in response to engagement of the friction clutch and includes means for automatically adjusting the locating element in dependency on the extent of wear upon the friction linings in response to disengagement of the friction clutch. The locating element is movable axially of and away from the pressure plate, and the arresting means can include means for preventing movements of the locating element axially of and toward the pressure plate.

The compensating means can be characterized as including a freewheel which is operative during disengagement but is self-locking during engagement of the friction clutch.

In accordance with a presently preferred embodiment, the compensating means of the improved friction clutch can comprise a substantially ring-shaped locating element, and such compensating means further comprises ramps (forming part of the aforementioned equalizing means) which are installed between the locating element and the pressure plate. The ramps can include a first set of ramps which are adjacent the pressure plate and a complementary second set of ramps between the ramps of the first set and the locating element. Such compensating means (or more particularly the equalizing means of such compensating means) can further comprise means (e.g., in the form of coil springs) for biasing the ramps of one set against the ramps of the other set of ramps. The locating element can have a substantially U-shaped cross-sectional outline and can define a substantially annular space (e.g., in the form of an endless groove or channel) for the ramps. Such locating element can contain or can be made of a metallic sheet material, and the ramps can be distributed in the annular space in the circumferential direction of the locating element. The just described compensating means can further comprise means for preventing turning of at least one set of ramps relative to the locating element. Furthermore, the locating element can comprise means (e.g., in the form of ribs and grooves) for axially movably confining at least one set of ramps in the annular space.

The compensating means preferably further comprises wedges, for example, one for each ramp and each carrying the respective ramps. The wedges can be assembled in such a way that they include a first set non-rotatably and axially movably mounted on the locating element and engaging the pressure plate, and a second set between the wedges of the first set and the locating element. The wedges of the second set are movable in the annular space of the locating element relative to the locating element to thereby effect an axial movement of the wedges of the first set and of the locating element relative to each other. Such compensating means can further comprise means (such as pins, studs or other suitable projections and complementary holes, bores, windows or sockets) for preventing rotation of the locating element and the pressure plate relative to each other. Still further, the compensating means can comprise means for biasing each wedge of the second set against a discrete wedge of the first set. Such biasing means can comprise springs (e.g., coil springs) which react against the wedges of the first set and bear against the wedges of the second set. The wedges can be provided with suitable retainers for the respective springs; if the springs are coil springs, the retainers can include studs, plugs or other suitable means for guiding at least the end portions of the respective coil springs.

At least a portion of each wedge of one set is preferably disposed axially of the pressure plate between the locating element and one wedge of the other set.

At least some wedges can contain a heat-resistant and heat-insulating material. For example, at least some of the wedges can contain a heat-resistant material which is selected from the group consisting of thermoplastic and pressure setting (duroplastic) plastic materials.

The wedges of one set can consist of a material having a first coefficient of friction, and the wedges of the other set can consist of a material having a different second coefficient of friction.

The arresting means can include means for limiting the extent of axial movability of the pressure plate away from the counterpressure plate and toward the housing during disengagement of the clutch, and the resilient device (such as the aforementioned diaphragm spring) can include a portion (e.g., a circumferentially complete annular main portion) which bears upon the compensating means in engaged condition of the clutch and is movable axially of the pressure plate to a greater second extent (i.e., to an extent greater than that of axial movability of the pressure plate away from the counterpressure plate and toward the housing) in response to disengagement of the clutch. The arrangement can be such that the resilient device biases the compensating means only in engaged condition of the clutch.

The locating element of the compensating means can be designed and positioned to be biased by the resilient device in engaged condition of the clutch, the wedges of one set can be non-rotatably mounted on the pressure plate, and the locating element and the wedges of the other set can be mounted for rotational movement relative to the pressure plate.

Another feature of the invention resides in the provision of an engageable and disengageable friction clutch, particularly for use in motor vehicles, which comprises a housing or cover rotatable about a predetermined axis (e.g., the axis of the output element of the combustion engine in a motor vehicle), a pressure plate, means (e.g., leaf springs) for non-rotatably connecting the pressure plate to the housing with limited freedom of movement in the direction of the predetermined axis, an axially stressed diaphragm spring between the housing and the pressure plate, an annular seat which tiltably mounts the diaphragm spring in the housing, a counterpressure plate (such as a flywheel) which is rotatable with the housing, and a clutch disc having friction linings between the two plates. The diaphragm spring serves to bias the pressure plate and to thus clamp the friction linings between the two plates in engaged condition of the clutch whereby at least the friction linings are subject to wear as a result of repeated engagement and disengagement of the clutch, and the clutch further comprises means for compensating for wear at least upon the friction linings. The compensating means is disposed between the pressure plate and the diaphragm spring and includes at least one locating element which is movable in the direction of the predetermined axis and is biased by the spring, and the clutch also comprises arresting means including means for limiting and for maintaining at least substantially constant the extent of axial movability of the pressure plate away from the counterpressure plate. The limiting means is disposed between the pressure plate and at least one axially fixed part of the clutch (such as the counterpressure plate or the housing) and includes means for limiting the axial movability of the locating element relative to the pressure plate at least during disengagement of the clutch.

A further feature of the invention resides in the provision of a novel and improved combination of component parts in an engageable and disengageable friction clutch for use in motor vehicles or the like. The combination comprises a pressure plate which is rotatable about and is movable in the direction of a predetermined axis, a diaphragm spring which reacts against an axially fixed part of the clutch to bias the pressure plate axially in engaged condition of the clutch, and arresting means including means for limiting the extent of movability of the pressure plate toward the diaphragm spring in response to disengagement of the clutch. The diaphragm spring includes a portion which at least indirectly bears upon the pressure plate in engaged condition of the clutch and is movable axially of the pressure plate to a greater second extent in response to disengagement of the clutch. The combination further comprises a wear compensating unit between the pressure plate and the diaphragm spring, and such unit is biased by the diaphragm spring only in engaged condition of the clutch.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
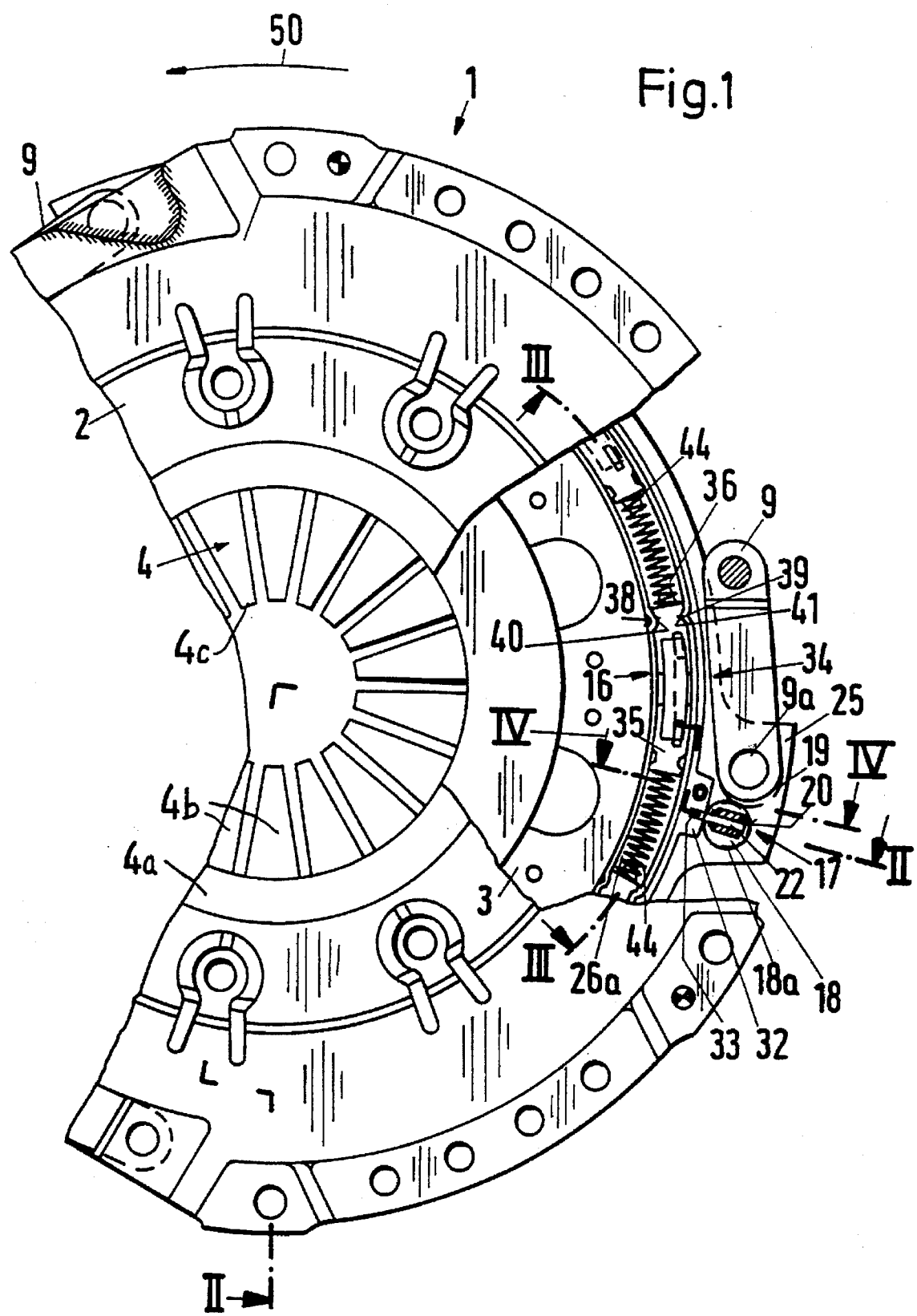
FIG. 1 is a fragmentary front elevational view of a friction clutch which embodies one form of the invention, certain parts of the friction clutch being broken away to reveal portions of the compensating and arresting means.
Figure 2:
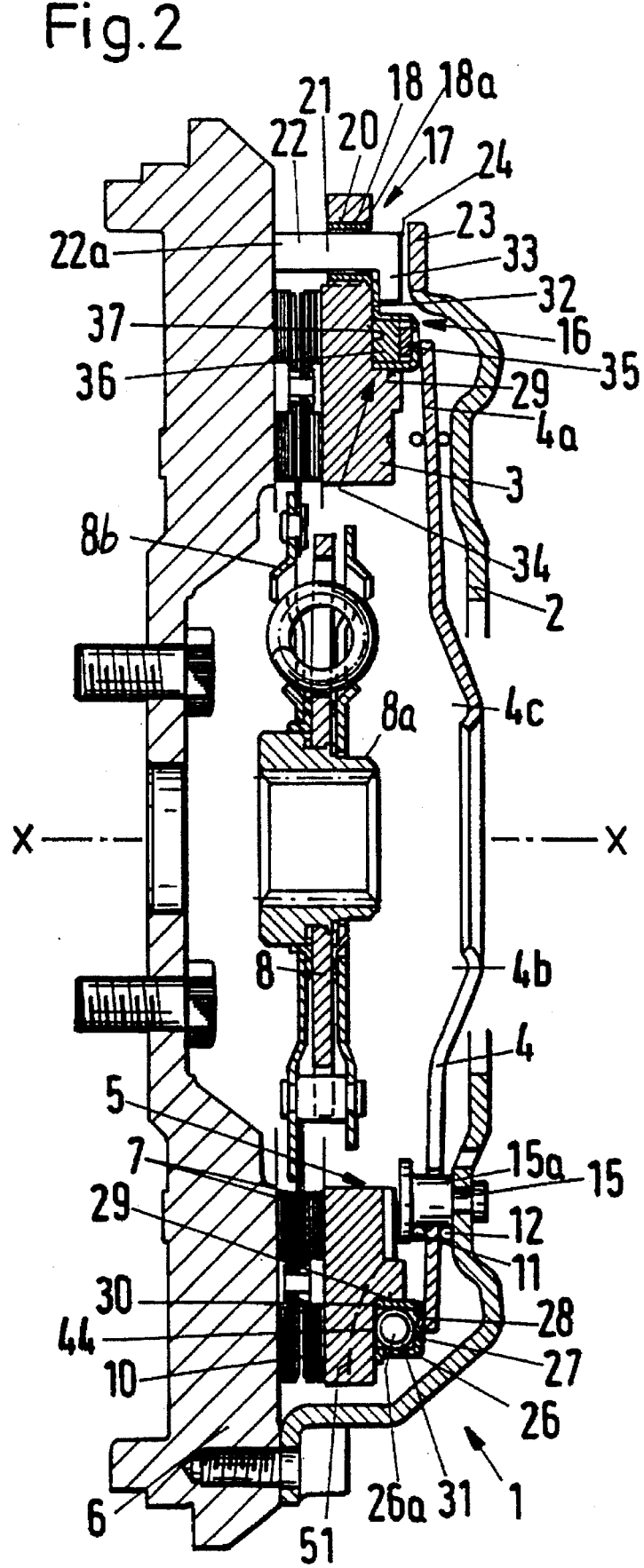
FIG. 2 is a sectional view substantially as seen in the direction of arrows from the line II—II in FIG. 1.

The friction clutch 1 which is shown in FIGS. 1 and 2 comprises a rotary housing or cover 2 and a rotary pressure plate 3 which is coaxial with and shares all angular movements of the cover. Leaf springs 9 are provided to axially movably connect the pressure plate 3 with the cover 2 so that the pressure plate can move away from the cover in response to engagement of the friction clutch 1 and toward the cover when the friction clutch is being disengaged. The extent of axial movability of the pressure plate 3 away from the cover 2 is limited by a rotary counterpressure plate 6 and the friction linings 7 of a torque transmitting clutch disc or clutch plate 8 having a hub 8a connectable to the input shaft of a variable-speed transmission in a motor vehicle. The counterpressure plate 6 is or can constitute a flywheel which is driven by the output element (e.g., a crankshaft) of a combustion engine in a motor vehicle. The outer marginal portion 23 of the cover or housing 2 is bolted or screwed to the marginal portion of the counterpressure plate 6 so that these parts rotate as a unit when the plate 6 is driven by the output element of the engine.

The friction clutch 1 further comprises at least one actuating device and a resilient device 4 which is installed between the cover 2 and the pressure plate 3. The illustrated resilient device 4 is a stressed diaphragm spring which reacts against the cover 2 and indirectly bears against the pressure plate 3 when the friction clutch 1 is engaged, i.e., when the plates 3 and 6 compress the friction linings 7 between them so that the hub 8a can transmit torque to the input element of the transmission. A composite seat 5 is provided on the cover 2 to tiltably mount an annular main portion 4a of the diaphragm spring 4. The actuating device of the friction clutch 1 includes a set of resilient prongs 4b which extend radially inwardly from the main portion 4a of the diaphragm spring 4 and whose radially innermost portions or tips 4c can be moved to the left (as viewed in FIG. 2) in order to disengage the friction clutch 1 by tilting the main portion 4a at the seat 5 so that the substantially tangentially extending leaf springs 9 can retract the pressure plate 3 axially of and away from the counterpressure plate 6 and hence from the linings 7 of the clutch disc 8. The friction linings 7 of the clutch disc 8 are mounted on two sets of resilient carriers 10 which, in turn, are mounted on a disc 8b of the clutch plate 8. The carriers 10 permit a gradual buildup of torque in response to engagement of the friction clutch 1, namely when the prongs 4b are released by the aforediscussed bearing of the clutch engaging-disengaging (actuating) means so that the main portion 4a of the diaphragm spring 4 automatically reassumes the position which is shown in FIG. 2. Thus, the pressure plate 3 then bears against the adjacent friction lining 7 and urges the other friction lining 7 against the adjacent friction surface of the counterpressure plate 6 which is assumed to be driven by the output element of the combustion engine. The magnitude of torque which is being transmitted from the counterpressure plate 6 to the input element of the transmission increases gradually in response to engagement of the friction clutch 1 because this entails gradual deformation of the carriers 10 under the bias of the diaphragm spring 4 while the latter moves the pressure plate 3 axially of the cover 2 toward the counterpressure plate 6.

The illustrated friction clutch 1 can be modified by omitting the carriers 10 and by mounting the friction linings 7 directly on the disc 2b of the clutch plate 8. Such friction linings can be rigidly or practically rigidly affixed to the disc 2b.

The composite seat 5 for the main portion 4a of the diaphragm spring 4 comprises two individual seats 11, 12 in the form of wire rings. The wire ring 12 is installed between the inner side of the cover 2 and the adjacent side of the main portion 4a of the diaphragm spring 4, and the wire ring 11 is disposed at that side of the main portion 4a which faces the pressure plate 3. The means for centering the wire rings 11, 12 and the main portion 4a of the diaphragm spring 4 in the cover 2 comprises fastening elements in the form of rivets 15 which are secured to the cover 2 and have shanks 15a extending through slots between neighboring prongs 4a of the diaphragm spring 4. The axes of the rivets 15 are parallel to the common axis X—X of the plates 3, 6, cover or housing 2, clutch disc or plate 8 and diaphragm spring 4.

The wear upon the friction linings 7 (and at least to some extent also upon the friction surfaces of the plates 3 and 6) increases in response to repeated engagements and disengagements of the friction clutch 1 by the actuating device including the prongs 4b and the means for moving the tips 4c of the prongs 4b in the direction of the axis X—X. The improved friction clutch 1 comprises novel and improved means for accounting at least for wear upon the friction linings 7, and such means includes a unit 16 which compensates for wear and is installed between the cover 2 and the pressure plate 3 (and more specifically between the plate 3 and the diaphragm spring 4) for movement in the direction of the axis X—X to a position which depends from (i.e., which is a function of) the extent or wear upon the friction linings 7. The aforementioned accounting means further comprises a unit 17 which serves to arrest the compensating unit 16 in an optimum position, namely when the position of the compensating unit 16 accurately reflects the extent of wear at least upon the friction linings 7 or upon the friction linings as well as upon the plates 3 and 6. The improved arresting unit 17 is provided on the pressure plate 3.

The arresting unit 17 of the friction clutch 1 which is shown in FIGS. 1 and 2 comprises or constitutes at least one sensor serving as a means for monitoring the extent of wear upon the friction linings 7 and including a sensor element 22 which is movable relative to the pressure plate 3 into abutment with at least one axially fixed part (such as the counterpressure plate 6 or the cover 2) of the friction clutch 1 to thereby limit the extent of movability of the pressure plate 3 away from the counterpressure plate 6.

The arresting unit 17 further comprises a sleeve 18 which is non-rotatably installed in a bore or hole 20 of the pressure plate 3. The sleeve 18 defines a slot 21 for the sensor element 22 here shown as comprising two leaf springs extending in parallelism with the axis X—X. The two leaf springs of the sensor element 22 bear against each other, and at least one of these leaf springs is or can be slightly arched. It is presently preferred to assemble the sensor element 22 of two leaf springs having convex sides which face and abut each other. These leaf springs are installed in the slot 21 of the sleeve 18 in prestressed condition so that a predetermined force must be applied in order to effect a relative movement between the leaf springs of the sensor element 22 and the sleeve 18 in parallelism with the axis X—X. Otherwise stated, it is necessary to overcome a predetermined friction before the leaf springs of the sensor element 22 can be shifted in the slot 21 of the sleeve 18.

The length of the sensor element 22 in the direction of the axis X—X is selected in such a way that, when the friction clutch 1 is engaged (so that the friction linings 7 are clamped between the plates 3 and 6), the leaf springs of the sensor element 22 and a stationary part of the friction clutch (note the marginal portion 23 of the cover or housing 2) define a clearance or gap 24 of predetermined width. This is shown in the upper portion of FIG. 2. The width of such clearance or gap 24 corresponds to the extent of axial movement of the pressure plate 3 from a position of engagement with the adjacent friction lining 7 to a position corresponding to that when the clutch 1 is disengaged. The left-hand end portion 22a of the sensor element 22 (as viewed in FIG. 2) bears against the counterpressure plate 6 when the clutch 1 is engaged. This ensures that, as the wear upon the friction linings 7 progresses, the pressure plate 3 moves axially relative to the leaf springs of the sensor element 22. Thus, the frictional engagement between the leaf springs of the sensor element 22 and the sleeve 18 is then overcome under the bias of the diaphragm spring 4 which urges the pressure plate 3 toward the counterpressure plate 6 in engaged condition of the friction clutch 1. The sleeve 18 can be made of a suitable plastic material or of any other material which can be used to establish optimal friction between the surface bounding the slot 21 and the adjacent surfaces of leaf springs forming part of the sensor element 22.

The bore or hole 20 which is shown in the upper portion of FIG. 2, and into which the leaf springs of the sensor element 22 are fitted in predetermined axial and angular positions, is machined into or is otherwise formed in a radially outwardly extending projection or lobe 25 (see FIG. 1) of the pressure plate 3. This projection further carries a rivet 9a for one end portion of one of the leaf springs 9 which axially movably connect the pressure plate 3 to the cover or housing 2, i.e., to the counterpressure plate 6 (which is fixedly connected with the cover 2).

Any shifting of the sleeve 18 relative to the lobe 25 in a direction toward the counterpressure plate 6 can be prevented by the expedient of providing the sleeve with a collar 18a which abuts the right-hand side of the pressure plate 3 (as viewed in FIG. 2) and faces the inner side of the cover 2. Movements of the sleeve 18 in the opposite direction (toward the cover 2) can be prevented by dimensioning the adjacent leaf spring 9 in such a way that it partially overlies the sleeve (this is indicated in FIG. 1 by broken lines as at 19). The leaf spring 9 which is shown at the three o'clock position of FIG. 1 can be designed to actually urge the sleeve 18 axially into the bore or hole 20. Angular movements of the sleeve 18 into the bore or hole 20 can be prevented by suitable profiling of the external surface of the sleeve and of the surface bounding the hole 20. Furthermore, the sleeve 18 can be provided with a socket which receives the adjacent portion 19 of the leaf spring 9 to thus even further reduce the likelihood of any angular movements of the sleeve in the bore or hole 20.

Figure 5:
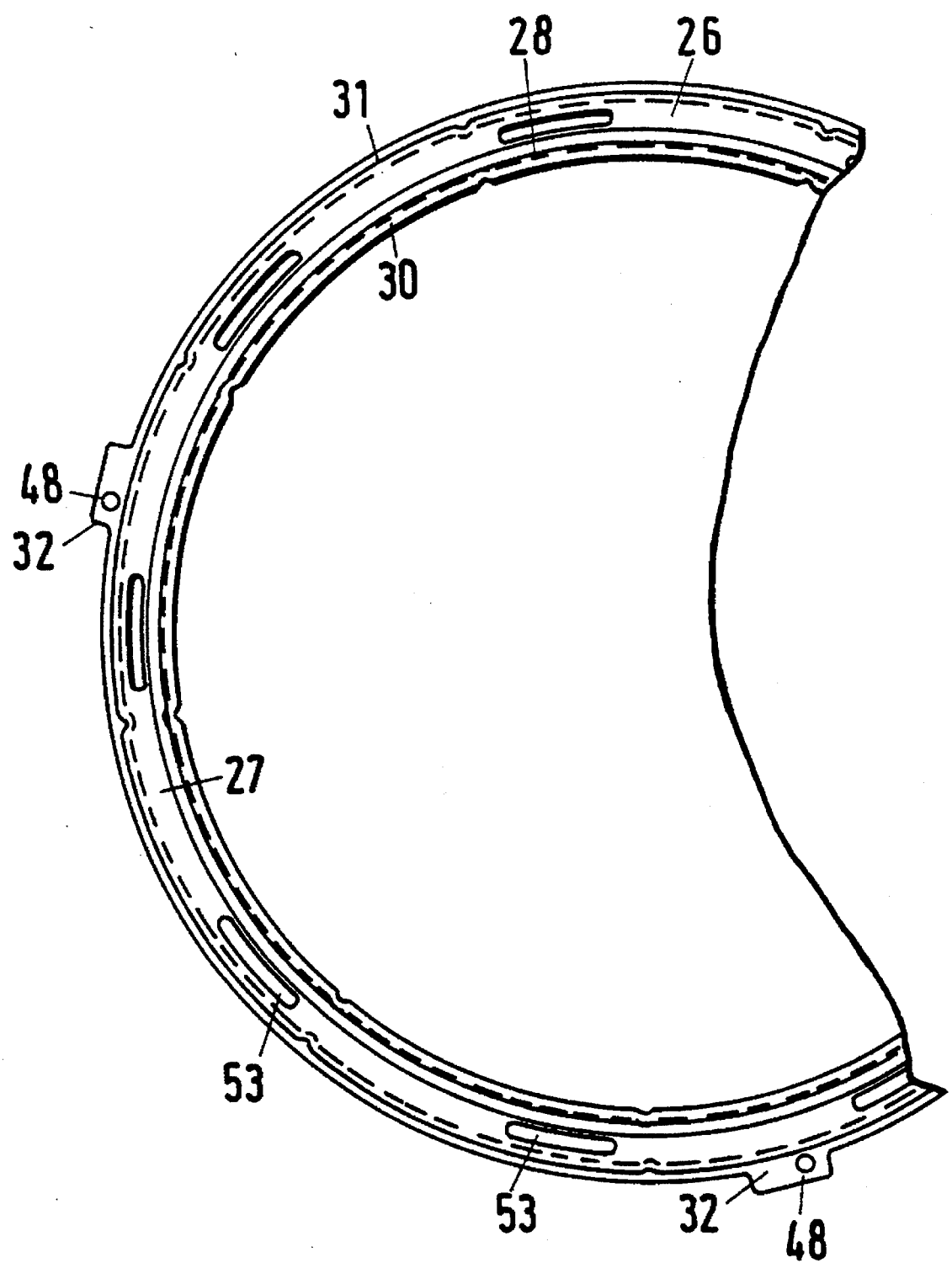
FIG. 5 is a fragmentary elevational view of a ring-shaped locating element of the compensating means in the friction clutch of FIGS. 1 to 4.

The compensating unit 16 for wear upon the friction linings 7 comprises a ring-shaped locating element 26 having a U-shaped cross-sectional outline and being acted upon by the diaphragm spring 4, at least when the friction clutch 1 is engaged. The locating element 26 can be made of a metallic sheet material and a portion thereof is shown in detail in FIG. 5. As can also be seen in FIG. 2, the element 26 comprises a washer-like bottom wall 27 which is adjacent the radially outermost part of the main portion 4a of the diaphragm spring 4, and two spaced-apart inner and outer cylindrical or substantially cylindrical sidewalls 30, 31 extending from the bottom wall 27 toward the counterpressure plate 6 and flanking an annular space or channel 26a. The outer side of the bottom wall 26 is provided with a plurality of arcuate protuberances 28 or with a circumferentially complete ring-shaped protuberance extending toward the cover 2. Such protuberance or protuberances 28 (it is assumed that the illustrated ring-shaped locating element 26 has a plurality of equidistant arcuate protuberances 28) can be formed by impressing grooves or recesses into the inner side of the bottom wall 27, i.e., by simply deforming selected portions of the bottom wall 27. The provision of an annulus of arcuate protuberances 28 with passages or channels between neighboring protuberances exhibits the advantage that the passages or channels establish paths for the circulation of air which cools the locating element 26 when the main portion 4a of the diaphragm spring 4 bears against the protuberances 28 in engaged condition of the friction clutch 1.

The pressure plate 3 is provided with means for centering the locating element 26 (see particularly FIG. 2). The centering means comprises at least one shoulder 29 which engages the adjacent outer side of the inner sidewall 30 of the locating element 26 and ensures that the axis of the element 26 coincides with the axis X—X. The centering shoulder 29 can constitute a circumferentially complete cylindrical surface or it can be composed of a plurality of relatively short arcuate surfaces.

The radially outer sidewall 31 of the locating element 26 of the compensating unit 16 is provided with a plurality of preferably equidistant radially outwardly projecting extensions in the form of lugs or stops 32 each of which cooperates with a sensor element 22 of the arresting unit 17. It is preferred to provide the friction clutch 1 with an arresting unit 17 which comprises a plurality of preferably equidistant sensor elements 22, one for each lug or stop 32 on the outer sidewall 31 of the locating element 26. Each sensor element 22 comprises a second end portion or leg 33 which extends radially inwardly of the pressure plate 3 and overlies the adjacent stop 32. Such mounting limits the axial movability of the locating element 26 in the direction of the axis X—X and away from the pressure plate 3, i.e., toward the cover 2.

The compensating unit 16 of the friction clutch 1 further comprises or cooperates with an equalizing unit 34 which is installed between the pressure plate 3 and the locating element 26 and serves to automatically compensate for wear upon the friction linings 7 in response to disengagement of the friction clutch, i.e., in response to movement of the pressure plate 3 axially and away from the counterpressure plate 6, namely toward the cover or housing 2. The equalizing unit 34 becomes effective in response to detection of some wear upon the friction linings 7 or in response to detection of additional wear upon such linings. The equalizing action of the unit 34 is automatic and involves an adjustment of the position of the locating element 26. The equalizing unit 34 is effective only in response to disengagement of the friction clutch 1 and is self-locking during engagement, i.e., when the diaphragm spring 4 is free to move the pressure plate 3 away from the cover 2 and into engagement with the adjacent friction lining 7 to urge the other friction lining 7 against the axially fixed counterpressure plate 6. Thus, the equalizing unit 34 ensures that the axial position of the ring-shaped locating element 26 relative to the pressure plate 3 can change only in response to disengagement of the friction clutch 1 but remains unchanged during subsequent engagement so that the clutch plate 8 is again in a condition to transmit torque from the combustion engine (i.e., from the counterpressure plate 6) to the input element of the variable-speed transmission. The extent of axial displacement (if any) of the locating element 26 during disengagement of the friction clutch 1 is proportional to the extent of wear (or to the extent of additional wear) at least upon the friction linings 7 or upon the friction linings and the plate 3 and/or 6.

Figure 3:
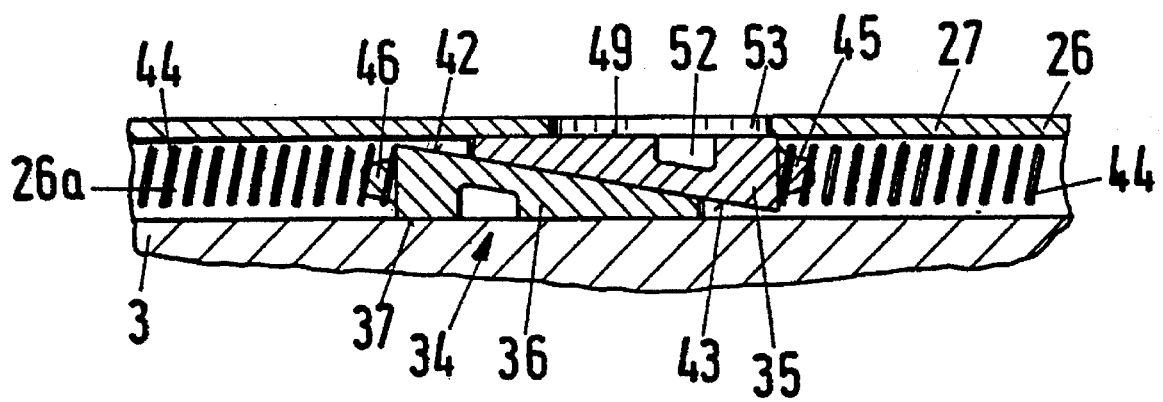
FIG. 3 is a sectional view substantially as seen in the direction of arrows from the line III—III in FIG. 1.

The illustrated equalizing unit 34 comprises several pairs of complementary ramps 42, 43 which are preferably equidistant from each other in the circumferential direction of the locating element 26 and are installed in the annular space 26a. As can be seen in FIG. 3, the ramps 42 are provided on wedge-like members 36 which abut the pressure plate 3, and the ramps 43 are provided on wedge-like members 35 which abut the inner side of the bottom wall 27 of the locating element 26. The pressure plate 3 has a radially extending annular surface 37 in abutment with the adjacent wedges 36 which are non-rotatably but axially movably guided in the space 26a of the locating element 26. To this end, the sidewalls 30, 31 of the locating element 26 are provided with ribs 38, 39 or other suitable projections which extend into the space 26a and into complementary recesses or sockets 40, 41 of the wedges 36. The ribs 38, 39 and the sockets 40, 41 extend in parallelism with the axis X—X.

Each wedge 35 is installed between one of the wedges 36 and the inner side of the bottom wall 27 of the locating element 26. The arrangement is such that the ramp 42 of each wedge 36 abuts the ramp 43 of the adjacent wedge 35, and such ramps slope in the circumferential direction of the locating element 26. The wedges 35 and their ramps 43 are movable in the space 26a in the circumferential direction of the locating element 26. The equalizing unit 34 further comprises means for biasing the set of wedges 35 against the adjacent wedges 36 in the circumferential direction of the locating element 26, and such biasing means comprises coil springs 44 (see particularly FIGS. 1 and 3) each of which reacts against a wedge 36 of one pair of wedges 35, 36 and bears against a wedge 35 of the neighboring pair of such wedges. As already explained above, the wedges 36 are held against movement in the circumferential direction of the locating element 26 by the respective ribs 38, 39 and sockets 40, 41 but the wedges 35 can move circumferentially of the locating element 26 to thereby move the wedges 36 axially and to change the axial distance of the element 26 and the pressure plate 3 relative to each other. FIG. 3 shows that the end portions of the wedges 35 and 36 are respectively provided with retainers in the form of studs 45, 46 which extend into the adjacent end convolutions of the respective coil springs 44 of the equalizing unit 34. Intermediate portions (convolutions) of the coil springs 44 are guided by the adjacent surfaces of the walls 27, 30, 31 forming part of the locating element 26 as well as by the surface 37 of the pressure plate 3.

Figure 4:
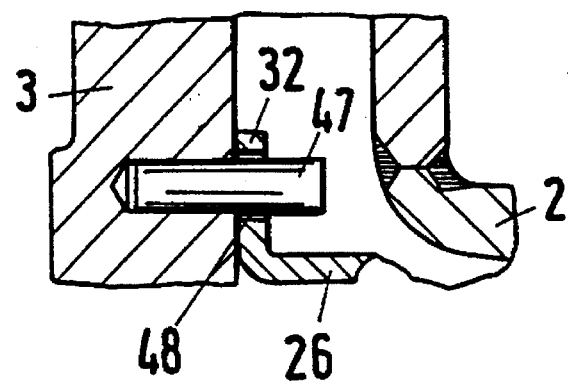
FIG. 4 is a sectional view substantially as seen in the direction of arrows from line IV—IV in FIG. 1.

The illustrated locating element 26 is mounted in such a way that it cannot turn relative to the pressure plate 3. As can be seen in FIG. 4, the means for preventing rotation of the parts 3 and 26 relative to each other comprises at least one pin or stud 47 which is recessed into the pressure plate 3 and extends in parallelism with the axis X—X and into a complementary opening 48 (see also FIG. 5) of one of the stops 32 at the outer side of the bottom wall 27 of the locating element 26. The pin or stud 47 of FIG. 4 further ensures that, when the friction clutch 1 is in use, the end portions or legs 33 of the sensor elements 22 are always aligned with the adjacent stops 32.

The wedges 35 and 36 can be made of a heat-resistant plastic material which can be a thermoplastic material or a pressure setting (duroplastic) material. It is often advisable to reinforce the wedges 35, 36 by filaments of glass or the like. By making them of a plastic material, the wedges 35 and 36 can be mass-produced in an injection molding, extruding or other suitable machine.

It is also within the purview of the invention to make at least one set (35 or 36) of the wedges from a friction generating material, e.g., a material which is customarily employed to make the friction linings 7. Still further, the wedges 35 and/or 36 can be made of metallic sheet material or of sintered material.

The slopes and the dimensions (particularly the length) of the ramps 42 and 43 are selected in such a way that an axial adjustment of the locating element 26 and pressure plate 3 can be carried out during the entire useful life of the friction clutch 1, i.e., that the extent of axial movability of the ramps suffices to account for minimal as well as for maximum permissible or acceptable wear upon the pressure plate 3 and/or 6 and/or upon the friction linings 7.

The slopes (shown at 49 in FIG. 3) of the ramps 42 and 43 (i.e., the inclination of a ramp 42 or 43 relative to a plate which is normal to the axis X—X) are selected in such a way that mere biasing of the abutting ramps 42, 43 against each other in the direction of the axis X—X does not entail any angular displacement of the wedges 35 relative to the adjacent wedges 36. Thus, frictional engagement between the abutting ramps 42, 43 suffices to ensure that the positions of the circumferentially movable ramps 35 relative to the adjacent ramps 36 remain unchanged. The slope 49 of the ramps 42, 43 will depend upon a number of parameters including the materials of the wedges 35, 36, the finish of the ramps 42, 43 and/or others. In most instances, the slope 49 will be in the range of 5°–20°, preferably between 8° and 12°, most preferably at least close to 10°. The orientation of the circumferentially movable wedges 35 in the annular space 26a is such that their narrower leading ends (the ends opposite the studs 45) face in the direction of rotation of the pressure plate 3 (arrow 50 in FIG. 1) when the friction clutch 1 is in use.

The bias of the coil springs 44 for the circumferentially movable wedges 35 is preferably related to the slope 49 with a view to ensure that the resultant force acting upon the ring-shaped locating element 26 in the direction of the axis X—X is smaller than the force which must be applied to move the sensor elements 22 of the arresting unit 17 in the axial direction of the friction clutch 1.

In designing the diaphragm spring 4, it is necessary to take into consideration that the bias to be applied to the pressure plate 3 in engaged condition of the friction clutch 1 must be increased to take into account (a) the force that is required to shift the sensor elements 22 and (b) the force of the stressed leaf springs 9 acting between the cover 2 and the pressure plate 3. Still further, it is necessary to take into consideration the wear upon the contacting surfaces of the diaphragm spring 4 and the ring-shaped locating element 26 as well as the wear upon contacting surfaces of the sensor elements 22 and the counterpressure plate 6 and also between the sensor elements 22 and the housing or cover 2. The wear upon the sensor elements 22, counterpressure plate 6, cover 2, diaphragm spring 4 and element 26 should be relatively small, especially when compared with the wear upon the friction linings 7.

It is also necessary to ensure that the resiliency of the arcuate leaf springs constituting the sensor elements 22 should not be unduly diminished as a result of exposure to extensive heat which develops at the pressure plate 3 as a result of engagement of the friction clutch 1. To this end, the sleeves 18 for the sensor elements 22 are preferably made of a material which exhibits a low thermal conductivity and has a high friction coefficient. As already mentioned above, the wedges 35, 36 can be made of the same material as the friction linings 7 and/or of the same material as the sleeves 18 for the sensor elements 22.

More satisfactory cooling of the friction clutch 1, particularly of the pressure plate 3, can be achieved by providing the pressure plate with an array of recesses, grooves or channels (one such channel is indicated in FIG. 2 by broken lines, as at 51). The channels 51 preferably extend substantially radially of the pressure plate 3 and preferably alternate with pairs of cooperating wedges 35, 36 (as seen in the circumferential direction of the pressure plate 3 and locating element 26). Each such channel 51 is preferably provided in that side or surface (27) of the pressure plate 3 which confronts the locating element 26. The cooling action can be improved still further, or such cooling action can be established if the channels 51 are omitted, by providing the locating element 26 with coolant conveying channels in the region of the springs 44 in the annular space 26a. If provided, such channels preferably extend from the bottom wall 27 in parallelism with the axis X—X to establish paths for the flow of coolant between the locating element 26 and the diaphragm spring 4.

It is also within the purview of the invention to apply films or other coats or layers of wear-resistant material (such as molybdenum). For example, films of molybdenum or other strongly wear-resistant material can be applied to the regions of contact between the diaphragm spring 4 and the locating element 26, to the regions of contact between the sensor elements 22 and the counterpressure plate 3, to the regions of contact between the sensor elements 22 and the cover 2 and/or to the regions of contact between other parts which should be capable of standing long periods of use. It is also possible to replace coats of molybdenum or the like with layers of hard chrome. Still further, it is possible to employ wear-resistant plastic materials. For example, those portions of the sensor elements 22 which are adjacent the counterpressure plate 6 and the marginal portion 23 of the cover 2 can be provided with jackets of suitable strongly wear-resistant plastic material.

The leaf springs 9 (which transmit torque between the cover 2 and the pressure plate 3) are installed in stressed condition so that they move the pressure plate 3 axially of and away from the counterpressure plate 6, i.e., away from the friction linings 7 and toward the cover 2, when the friction clutch 1 is disengaged. Such mounting of the leaf springs 9 in stressed condition ensures that the locating member 26 abuts the diaphragm spring 4 at least substantially during the entire stage of disengagement of the friction clutch 1, namely until the arresting means 17 becomes effective.

The extent of axial displacement of the tips 4c of prongs 4b for the purpose of disengaging the friction clutch 1 is preferably selected in such a way that, when the disengagement of the friction clutch is completed, the radially outermost part of the main portion 4a of the diaphragm spring 4 is slightly disengaged from the locating element 26. Thus, disengagement of the friction clutch results in such axial movement of that part of the diaphragm spring 4 which is nearest to the locus of application of bias to the pressure plate 3 in engaged condition of the clutch that this movement covers a distance greater than the clearances 24 between the sensor elements 22 and the adjacent parts of marginal portion 23 of the cover 2. As explained hereinbefore, the clearances 24 have a width corresponding to the extent of movability of the pressure plate 3 away from the counterpressure plate 6.

FIG. 2 shows the components of the improved friction clutch 1 prior to any, or any appreciable, wear upon the friction linings 7 and/or other parts. Once the components (especially the friction linings 7) have undergone at least some wear, the position of the pressure plate 3 is changed in a direction toward the counterpressure plate 6, i.e., the thickness of that part of the clutch plate 8 which includes the linings 7 is reduced. This, in turn, entails a change of conicity of the main portion 4a of the diaphragm spring 4 and hence of the magnitude of force which is being applied by the diaphragm spring to the pressure plate 3 in engaged condition of the friction clutch 1. The arrangement is preferably such that the bias of the spring 4 upon the pressure plate 3 increases. The aforediscussed changes (as a result of wear upon the friction linings 7) entail that the pressure plate 3 changes its axial position relative to the sensor elements 22 which abut the counterpressure plate 6 (at 22a in FIG. 2). The diaphragm spring 4 biases the locating element 26 in a direction toward the counterpressure plate 6 to an extent corresponding to the extent of wear upon the friction linings 7, i.e., to an extent corresponding to the extent of axial displacement of the pressure plate 3 away from the cover 2 and toward the counterpressure plate 6. Therefore, the extensions 32 of the element 26 move away from the adjacent legs 33 of the corresponding sensor elements 22 through a distance matching (at least substantially) the extent of wear upon the friction linings 7. The locating element 26 does not change its axial position relative to the pressure plate 3 during engagement of the friction clutch 1 because it is biased toward the pressure plate by the diaphragm spring 4 and the equalizing unit 34 is self-locking in the course of engagement of the clutch, i.e., the equalizing unit 34 then acts not unlike a lock in the axial direction of the clutch 1. However, when the friction clutch 1 is thereupon disengaged, the leaf springs 9 bias the pressure plate 3 in a direction toward the cover 2, i.e., away from the friction linings 7 and counterpressure plate 6. The axial displacement of pressure plate 3 toward the cover 2 (under the bias of the leaf springs 9) continues until the sensor elements 22 ultimately reach the cover 2, and more particularly the marginal portion 23 of the cover. The extent of such axial movement of the pressure plate 3 can be said to correspond to the extent of one stage of movement of the tips 4c of prongs 4b during disengagement of the clutch 1, and the axial position of the locating element 26 relative to the pressure plate 3 remains unchanged during the just described stage of disengagement of the clutch. As the disengagement continues, the pressure plate 3 comes to a halt (i.e., it can no longer move away from the counterpressure plate 6) but the locating element 26 is free to continue its movement with the adjacent portion of the diaphragm spring 4 until the extensions 32 on the bottom wall 27 of the element 26 reengage the adjacent end portions or arms 33 of the respective sensor elements 22. The locating element 26 is moved axially by the wedges 35 which are biased by the respective coil springs 44. Thus, the wedges 35 move circumferentially of the locating element 26 and relative to the neighboring wedges 36 as long as the extensions 32 of the bottom wall 27 have freedom of movement toward and into engagement with the end portions or legs 33 of the adjacent sensor elements 22. As already mentioned above, the pressure plate 3 is lifted off and away from the friction linings 7 under the bias of the leaf springs 9 which are installed between the pressure plate and the cover 2 in such a way that they are stressed axially in a sense to bias the pressure plate 3 toward the cover 2. If the tilting of the main portion 4a of the diaphragm 4 in a direction to effect a disengagement of the friction clutch 1 continues, the radially outermost part of the main portion 4a moves axially and away from the locating element 26 as soon as the latter is intercepted by the end portions or legs 33 of the sensor elements 22 (such legs then engage the adjacent extensions 32 of the bottom wall 27). It has been found that the just described disengagement of the radially outer part of the main portion 4a of the diaphragm spring 4 from the ring-shaped locating element 26 is particularly desirable and advantageous for proper operation of the arresting unit 17 and equalizing unit 34.

The units 17 and 34 ensure that the axial displacements of the locating element 26 under the action of the two sets of wedges 35, 36 invariably reflect the extent of wear at least upon the friction linings 7. The reason is that the locating element 26 is confined to movement in the direction of the axis X—X between the sensor elements 22 on the one hand and the pairs of wedges 35, 36 on the other hand. This ensures that the extent of axial movability of the locating element 26 cannot and does not exceed the extent of axial shortening of the radially outer portion of the clutch plate 8 due to progressing wear upon the friction linings 7 as a result of repeated engagement and disengagement of the friction clutch 1.

Another advantage of the just described construction and mode of operation of the units 16, 17 and 34 is that the extent of axial movement of the locating element 26 is always properly related to the extent of wear upon the friction linings 7, even if the means for disengaging the friction clutch 1 performs a movement beyond a position in which the clutch is already disengaged. Thus, even if the prongs 4b are flexed toward the counterpressure plate 6 to an extent greater than required to complete the disengagement of the friction clutch 1, this cannot result in undue or improper or unnecessary axial displacement of the parts of the units 17 and 34 because, even if the sensor elements 22 happen to impinge upon the marginal portion 23 of the housing or cover 2 with a relatively large force, the self-locking equalizing unit 34 ensures that the sensor elements 22 remain adequately supported by way of the abutments 32. Thus, when the friction clutch 1 is disengaged, the sensor elements 22 can be acted upon by axially oriented forces which are effective in a direction toward the counterpressure plate 6 and are stronger than the strength of the force-locking connection between the sensor elements 22 and the pressure plate 3; this does not result in axial displacement of sensor elements 22 and pressure plate 3 relative to each other.

The improved system including the units 16, 17 and 34 ensures that the characteristic curve range of the diaphragm spring 4 remains unchanged during the entire useful life of the friction clutch 1. Furthermore, the bias of the diaphragm spring 4 remains at least substantially constant when the friction clutch 1 is engaged, regardless of the extent of wear upon the friction linings 7, i.e., the bias of the diaphragm spring 4 upon the pressure plate 3 remains unchanged. This renders it possible to employ a diaphragm spring having a degressive characteristic curve during disengagement of the friction clutch 1, and such diaphragm spring is preferably employed in combination with a clutch plate 8 wherein the two friction linings 7 flank several pairs of resilient carriers 10 tending to move the two friction linings 7 axially and away from each other. The carriers 10 ensure that the magnitude of disengaging force which is required to effect a movement of the pressure plate 3 away from the counterpressure plate 6 can be reduced to a relatively low value and remains practically constant during the entire useful life of the friction clutch 1 provided that the spring characteristic of the friction linings 7 remains at least substantially unchanged during the interval which elapses between the initial use of clutch 1 (with intact linings) and the time when the wear upon the friction linings has reached the maximum permissible value.

When a friction clutch of the above outlined character is being disengaged, the diaphragm spring 4 is tilted at the seat 5 and the resilient carriers 10 for the friction linings 7 dissipate energy during a certain initial stage of disengagement of the clutch. Such dissipation of energy by the carriers 10 assists the disengagement of the friction clutch 1. Thus, the maximum value of the disengaging force can be reduced accordingly, i.e., such maximum force is less than a theoretical disengaging force which is determined by the condition of the diaphragm spring 4 and the leaf springs 9 in engaged condition of the friction clutch. Once the carriers 10 for the friction linings 7 have dissipated their energy, the friction linings 7 are released and, due to the degressive characteristic curve of the diaphragm spring 4 during disengagement of the friction clutch 1, the remaining disengaging force which must be applied to the tips 4c of the prongs 4b is already much smaller in comparison with that which would correspond to the conditions and/or positions shown in FIG. 2. As the disengagement of the clutch 1 continues, the magnitude of the disengaging force continues to decrease at least until it reaches a minimum or lower threshold value of the preferably sinusoidal characteristic curve of the diaphragm spring 4.

The units 17 and 34 of the friction clutch 1 of FIGS. 1 and 2 can be designed in such a way that, when the pressure plates 3, 6 and the cover 2 rotate, the convolutions of coil springs 44 in the annular space 26a of the ring-shaped locating element 26 abut the internal surface of the outer sidewall 31 so that the bias of such springs upon the respective wedges 35 is reduced (e.g., all the way to zero) as a result of frictional engagement of the convolutions with the wall 31. Thus, when the friction clutch 1 rotates, the coil springs 44 can be said to be rigid or practically rigid (their bias upon the respective wedges 35 is zero or close to zero due to frictional engagement of such springs with the wall 31). In addition, the action of centrifugal force upon the wedges 35 (when the friction clutch 1 rotates) causes these wedges to frictionally engage the internal surface of the outer sidewall 31 with the same result as described above in connection with frictional engagement between the convolutions of the springs 44 and the wall 31, i.e., the wedges 35 are then held against movement in the circumferential direction of the locating element 26. The arrangement can be such that the magnitude of centrifugal force upon the coil springs 44 and/or upon the wedges 35, at least above the idling speed of the engine which rotates the counterpressure plate 6, is sufficient to ensure that the springs 44 are incapable of shifting the mobile wedges 35 in the circumferential direction of the locating element 26 so that the distance of the locating element 26 and the pressure plate 3 from each other remains unchanged. In other words, the improved friction clutch 1 can be designed to ensure that any compensation for wear at least upon the friction linings 7 can take place only when the clutch is rotated at or below the idling speed of the engine, namely when the action of centrifugal force upon the coil springs 44 and/or upon the mobile wedges 35 does not suffice to block the movements of wedges 35 relative to the wedges 36.

However, it is also within the purview of the invention to design the equalizing unit 34 in such a way that the wedges 35 can be caused to move relative to the adjacent wedges 36 only when the engine which drives the counterpressure plate 6 is arrested or only when the RPM of the engine is low or very low, e.g., even below the idling speed.

The materials of the pairs of wedges 35, 36 and of the parts which are adjacent these wedges can be selected in such a way that the ramps 42, 43 of the wedges do not tend to adhere to each other during any stage of useful life of the friction clutch, i.e., that the ramps 42, 43 do not tend to prevent, or do not actually prevent, those adjustments of the ramps 35 relative to the adjacent ramps 36 which are necessary or desirable in order to compensate for wear upon the friction linings 7 alone or upon the friction linings and certain other parts which are likely to undergo at least some wear during the useful life of the friction clutch 1. For example, at least one of each pair of neighboring ramps 42, 43 can be coated with a material which reduces the likelihood of undesirable adherence of the wedges to one another. This also applies for eventual coating of those surfaces of the movable ramps 35 which contact the walls of the locating element 26.

Adherence of the abutting ramps 42, 43 to each other can be prevented in many other ways. For example, the friction clutch 1 can be provided with at least one device which positively urges the neighboring ramps 42, 43 axially of the locating element 26 and away from each other in automatic response to disengagement of the clutch, i.e., when the condition of the clutch is such that an adjustment or compensation for wear upon the friction linings 7 should take place. Such device or devices can be designed to reliably separate the ramps 43 from the adjacent ramps 42 not later than when the disengagement of the friction clutch 1 is completed so that the units 16, 17 and 34 are then in a condition to effect the necessary compensation for wear upon the friction linings 7 provided that the wear upon the linings has progressed to an extent which warrants an initial adjustment or a further adjustment during useful life of the clutch.

When the friction clutch 1 is still new or is yet to be fully assembled (e.g., prior to attachment of the marginal portion 23 of the housing or cover 2 to the counterpressure plate 6 so that an intact clutch plate 8 is disposed between the plates 3 and 6), the wedges 35 are maintained in retracted positions departing from those which are shown in FIG. 3. Thus, the wedges 35 are located further to the right of the respective wedges 36 so that the distance between the bottom wall 27 of the locating element 26 and the pressure plate 3 is reduced to a minimum. In other words, the combined thickness of the locating element 26 and pressure plate 3 (as seen in the direction of the axis X—X) is then reduced to a minimum value. In order to maintain the mobile wedges 35 in their fully retracted positions, these wedges are preferably provided with suitably configured portions (note the recesses 52 in FIG. 3) which are accessible through windows 53 (e.g., elongated slots extending circumferentially of the locating element 26) in the bottom wall 27. A suitable tool (not shown) can be provided to enter the recesses of the wedges 35 through the respective windows 53 and to maintain the mobile wedges 35 in fully retracted positions. The tool is put to use during assembly of the friction clutch 1 and is thereupon withdrawn so that the wedges 35 can assume positions which are determined by the respective coil springs 44 or analogous biasing means. Detachment of the tool results in activation of the equalizing unit 34. The length of the windows 53 in the circumferential direction of the bottom wall 27 should suffice to ensure maximum displacement of the wedges 35 relative to the locating element 26, i.e., to permit maximum compensation for wear upon the friction linings 7. When the friction clutch 1 is new, the mobile wedges 35 can be held in their fully retracted positions by the sensor elements 22 which secure the locating element 26 in the retracted position.

The automatically adjusting connections between the sensor elements 22 and the pressure plate 3 should be designed in such a way that the force which is required to shift the sensor elements 22 axially of the friction clutch 1 and relative to the pressure plate 3 exceeds the magnitude of the resultant force acting upon the locating element 26 and being generated by the coil springs 44 acting upon the mobile wedges 35.

The friction clutch 1 of FIGS. 1 and 2 can be modified by making the ramps 36 of one piece with the locating element 26. Otherwise stated, the ramps 36 can be omitted as long as the locating element 26 is provided with ramps 42 which cooperate with the adjacent ramps 43 of the mobile wedges 35. The coil springs 44 then serve as a means for turning the locating element 26 relative to the pressure plate 3. The extensions 32 of the thus modified locating element 26 must be lengthened in the circumferential direction of the bottom wall 27 in order to ensure that they can cooperate with the corresponding end portions or legs 33 in spite of the angular movability of locating element 26 relative to the pressure plate 3, i.e., during the entire useful life of a friction clutch which employs the modified locating element 26.

An advantage of the just described modified locating element 26 is that it permits angular adjustments of the locating element radially of the pressure plate 3 and from the outside in the fully assembled condition of the friction clutch. For example, the locating element 26 can be turned relative to the pressure plate 3 by engaging its extensions 32; these extensions are accessible through windows (not shown) in the cover or housing 2 of the thus modified friction clutch. The windows in the cover 2 can further serve to receive the radially outwardly extending lobes 25 of the pressure plate 3 and the leaf springs 9.

An important advantage of the improved friction clutch is that the compensating unit 16 cooperates with the arresting unit 17 to ensure that the bias of the diaphragm spring 4 upon the pressure plate 3 remains at least substantially constant during the entire useful life of the clutch, i.e., regardless of the extent of wear upon the friction linings 7 and, if warranting consideration, also regardless of the wear upon the pressure plate 3, counterpressure plate 6, cover 2 and diaphragm spring 4. The arresting unit 17 constitutes a safety feature which prevents overcompensation for wear upon the friction linings 7, i.e., which ensures that the axial adjustment of the pressure plate 3 in response to wear upon the friction linings 7 is not excessive. The arresting unit 17 is mounted on the pressure plate 3, and the adjustment in axial position of the pressure plate 3 is preferably carried out in the course of disengagement of the friction clutch 1. The sensor element or elements 22 of the arresting unit 17 ensure that the extent of movement of the pressure plate 3 relative to the cover 2 during disengagement of the friction clutch 1 remains at least substantially unchanged irrespective of the extent of wear upon the friction linings 7. Each sensor element 22 can be directly or indirectly coupled to the pressure plate 33 by automatic adjusting means to be displaced relative to the pressure plate by the fixed part 2 or 6 of the clutch. This relieves the compensating unit 16 during disengagement of the friction clutch so that the position of the pressure plate 3 can be adjusted (if and when necessary) to the extent determined by the sensor element or elements 22 in cooperation with the locating element 26.

As mentioned before, the arresting unit 17 can comprise a single sensor element 22. The provision of several sensor elements 22 is preferred in many instances because this reduces the likelihood of misalignment of the axis of the pressure plate 3 relative to the axis X—X of the counterpressure plate 6 in disengaged condition of the friction clutch 1.

The aforementioned automatic adjusting means includes the means for frictionally connecting the leaf springs of each sensor element 22 to the pressure plate 3 or an equivalent of such connecting means. The frictional engagement between the sensor elements 22 and the pressure plate 3 is overcome when the magnitude of a predetermined force is exceeded during engagement of the friction clutch 1. This results in axial displacement of sensor elements 22 relative to the pressure plate 3 through a distance corresponding to the ascertained extent of wear upon the friction linings 7. However, it is also possible to employ a compensating unit which acts not unlike a freewheel and is designed to permit an adjustment of the sensor element or elements 22 relative to the pressure plate during engagement but blocks any shifting of the sensor element or elements relative to the pressure plate during disengagement of the friction clutch.

The illustrated compensating unit 16 and its equalizing unit 34 with the two sets of ramps 42, 43 exhibit the advantage that the axial position of the pressure plate 3 is automatically adjusted to compensate for wear upon the friction linings 7 during disengagement of the friction clutch but that the unit 16 is self-locking during engagement of the friction clutch. Thus, the unit 16 can compensate for wear when the locating element 26 is relieved but the condition of the unit 16 remains unchanged when the element 26 is under stress. The locating element 26 can be moved axially of and away from the pressure plate 3 but cannot move toward the pressure plate. Accordingly, the illustrated compensating unit 16 also acts like a freewheel during disengagement but is self-locking during engagement of the friction clutch 1.

It has been found that the equalizing unit 34 of the illustrated compensating unit 16 operates quite satisfactorily if the friction coefficient of the material of the ramps 35 is different from that of the ramps 36 and if one of these friction coefficients matches or approximates the friction coefficient of the material of the friction linings 7. By properly selecting the just discussed friction coefficients as well as the slope 49 of the ramps 42 and 43, the unit 16 is self-locking when the diaphragm spring 4 is free to stress the locating element 26 in the direction of the axis X—X. As already mentioned above, the slope 49 can be in the range of 5°–20°, preferably 8°–12° and most preferably approximately 10°. The self-locking feature exhibits the advantage that it is not necessary to provide any additional means for the express purpose of ensuring that the compensating unit 16 is self-locking during certain stages of operation of the friction clutch 1.

The springs 44 of the equalizing unit 34 can be installed in stressed condition in such a way that an adjustment of axial position of the pressure plate 3 (in response to wear upon the friction linings 7) can take place even while the engine drives the counterpressure plate 6, the pressure plate 3, the cover 2 and the diaphragm spring 4. Furthermore, the stressing of the springs 44 can be selected with a view to ensure that their bias does not influence, or does not appreciably influence, the operation of other resilient components, particularly that of the diaphragm spring 4 and of the leaf springs 9 which connect the pressure plate 3 to the cover 2. The wedges 35 which are biased by the springs 44 and cooperate with the wedges 36 to change the axial position of the pressure plate 3 in order to compensate for wear upon the friction linings 7 form part of the means for locking or deactivating and unlocking or activating the compensating unit 16, i.e., they can cooperate with the neighboring ramps 36 to permit or to block the movements of the pressure plate 3 and the locating element 26 relative to each other.

The feature that disengagement of the friction clutch 1 entails an axial movement of the diaphragm spring 4 at the location of engagement with the pressure plate 3 (by way of the locating element 26) exceeds the extent of movability of the pressure plate 3 as determined by the sensor elements 22 is desirable and advantageous on the ground that the compensating unit 16 is then relieved and is free to adjust the axial positions of the pressure plate and the locating element relative to each other. This enhances the accuracy of compensation for wear upon the friction linings 7.

The carriers 10 for the friction linings 7 of the clutch plate 8 can be constructed and assembled in a manner as disclosed, for example, in published German patent application Serial No. 36 31 863. As already mentioned hereinbefore, the resilient carriers 10 can assist in manipulation of the friction clutch 1, particularly as concerns the disengagement in order to interrupt the transmission of torque from the counterpressure plate 6 to the clutch plate 8. Thus, the carriers 10 store additional energy when the clutch 1 is engaged, and such energy is dissipated during the initial stage of disengagement of the clutch. The stressed carriers 10 generate a reaction force acting counter to the bias of the diaphragm spring 4 upon the pressure plate 3. As the pressure plate 3 moves away from the counterpressure plate 6 during the initial stage of disengagement of the clutch 1, such movement is enhanced or promoted by the carriers 10 which tend to move the two friction linings 7 apart or to increase the axial length of that portion of the clutch plate 8 which includes the friction linings and the carriers. This takes place simultaneously with an abruptly decreasing part of the characteristic curve of the diaphragm spring 4 during disengagement of the clutch so that the bias of the spring 4 upon the pressure plate 3 decreases. This entails a reduction of the bias of the carriers 10 upon the pressure plate 3. The actually required disengaging force equals the difference between the restoring force of the carriers 10 and the bias of the diaphragm spring 4. The bias of the leaf springs 9, which are stressed between the pressure plate 3 and the cover 2, also warrants consideration. Once the carriers 10 have dissipated the stored energy during disengagement of the clutch 1, the force which is required to continue with disengagement of the clutch is determined primarily by the bias of the diaphragm spring 4. The force-distance characteristics of the diaphragm spring 4, carriers 10 and leaf springs 9 can be related to each other in such a way that, when the pressure plate 3 releases the clutch plate 8, the force which is required to continue to stress the diaphragm spring during disengagement of the clutch is rather small. In fact, it is possible to select and relate these characteristics in such a way that the characteristic of the carriers 10 equals or approximates the combined characteristics of the diaphragm spring and leaf springs 9 so that the last stage of disengagement of the clutch necessitates the exertion of a very small force or that such final stage of disengagement does not necessitate the application of any external force.

As a rule, the axial bias which is generated by the leaf springs 9 warrants consideration. The bias of the diaphragm spring 4 is selected by consideration of the fact that this spring must effect axial movements of the sensor elements 22 and the pressure plate 3 relative to each other. It is of advantage to select the force which is required to move the sensor elements 22 and the pressure plate 3 relative to each other in such a way that it reliably exceeds the resultant axial force attributable to the biasing of the wedges 35 against the wedges 36 so that such force can be taken up by the sensor elements 22.

Figure 6:
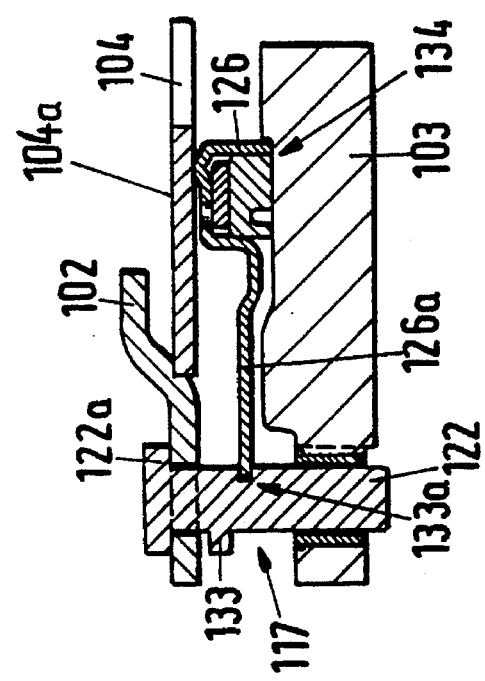
FIG. 6 is a fragmentary axial sectional view of a pull type friction clutch embodying modified compensating and arresting means.

An advantage of the aforedescribed novel system which compensates for wear upon the friction linings 7 is that it can be incorporated with equal or similar advantage in the so-called drawn or pull type friction clutches wherein the tips of the prongs on the main portion of the diaphragm spring must be pulled away from the counterpressure plate in order to disengage the friction clutch. In such pull type friction clutches, the radially outermost part of the main portion of the diaphragm spring is tiltable in a seat of the cover, and a radially inner part of the main portion serves to bias the pressure plate axially toward the friction linings when the friction clutch is engaged. Reference may be had to FIG. 6 which shows a portion of a pull type friction clutch. All such parts of this friction clutch which are identical with or clearly analogous to corresponding parts of the friction clutch 1 of FIGS. 1 to 5 are denoted by similar reference characters plus 100.

The equalizing unit 134 of the pull type friction clutch of FIG. 6 is installed between the pressure plate 103 and the diaphragm spring 104. The radially outermost part of the annular main portion 104a of the diaphragm spring 104 is tiltable relative to the cover 102. The equalizing device 134 can be identical with the equalizing device 34. The locating element 126 cooperates with the sensor elements 122 (one shown) of the arresting unit 117. The sensor elements 122 are adjusted relative to the pressure plate 103 in that their enlarged end portions or collars 122a engage the outer side of the cover 102. The legs 133 of the sensor elements 122 limit the extent of axial movability of the pressure plate 103 during disengagement of the pull type friction clutch embodying the structure of FIG. 6. In order to ensure proper operation of the friction clutch of FIG. 6, the ring-shaped locating element 126 is mounted at least with minimal freedom of axial movement relative to the sensor elements 122. This is achieved by the provision of a connection between the locating element 126 and the sensor elements 122. The connection includes radially outwardly extending resilient portions 126a forming integral or separable parts of the outer sidewall of the locating element 126 and extending into notches 133a provided in the sensor elements 122. The resiliency of the portions 126a is such that the elements 122 and 126 are movable relative to each other in the axial direction of the pull type friction clutch.

In accordance with a further modification which is not specifically shown in the drawings, each sensor element 122 can cooperate with the diaphragm spring 104 (instead of cooperating with the cover or housing 102). The cooperation is effective in at least one axial direction of the pull type friction clutch and takes place at least while the friction clutch is engaged. The abutment between a sensor element 122 and the diaphragm spring 104 of such modified clutch is located at least close to the radial level of the locus where the diaphragm spring 104 is tiltable relative to the housing or cover 102. If the invention is embodied in a pull type friction clutch, it is often advisable that the diameter of location of the diameters of locations of engagement between the diaphragm spring 4 and the sensor element or elements 122 be larger than the diameter of locations where the diaphragm spring 104 is tiltable relative to the cover 102. This can be seen in FIG. 6 wherein the locus of tiltable mounting of the radially outermost part of main portion 104a of the diaphragm spring 104 is located radially inwardly of the illustrated sensor element 122.

Figure 7:
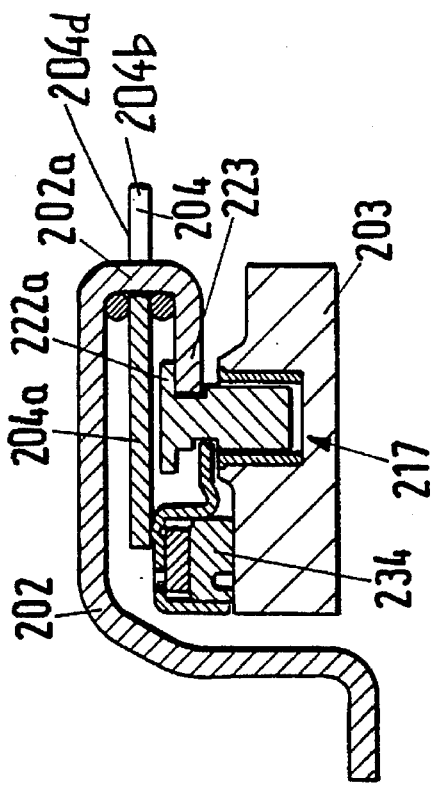
FIG. 7 is a fragmentary axial sectional view of a friction clutch embodying compensating and arresting means departing from those shown in FIGS. 1–5 and FIG. 6.

FIG. 7 shows a portion of a further friction clutch wherein the arresting unit 217 is also installed directly in the body of the pressure plate 203. Each sensor element 222 of the arresting unit 217 includes an abutment in the form of a collar or lug 222a which engages an inwardly bent portion 223 of the cover or housing 202. The portions 223 are of one piece with a portion of a seat 202a for the diaphragm spring 204. The illustrated seat 202a comprises prongs which are bent inwardly from the major portion of the cover 202 and extend through slots 204d between the radially inwardly extending prongs 204b of the diaphragm spring 204. The equalizing unit 234 of the friction clutch including the structure of FIG. 7 is installed in the cover 202 radially outwardly of the main portion 204a of the diaphragm spring 204 and radially outwardly of the sensor elements 222 forming part of the arresting unit 217.

The friction clutch including the structure of FIG. 7 can be modified by installing the sensor elements 222 in such a way that they are not coupled to the portion 223 of the cover 202 but rather to the diaphragm spring 204. The arrangement may be such that the sensor elements 222 are coupled to the diaphragm spring 204 in a manner to be supportable for movement in at least one of the two axial directions, at least when the friction clutch is being engaged. To this end, the diaphragm spring 204 can be provided with axial openings through which the elements 222 extend. The portion 222a of each sensor element 222 is then in engagement with the diaphragm spring 204 (rather than with the portion 223 of the cover 202) when the thus modified friction clutch of FIG. 7 is engaged. The portions 222a can be lifted off the diaphragm spring 204 when the friction clutch is disengaged because the diameter of the circle on which the portions 222a of the sensor elements 222 are located is smaller than the diameter of the location where the diaphragm spring 204 is tiltably mounted in the cover 202. This is due to the fact that the portions 222a are nearer to the tilting diameter of the diaphragm spring 204 than the locations of engagement between the diaphragm spring 204 and the pressure plate 203.

The improved friction clutch is susceptible of numerous additional modifications. For example, each of the illustrated and described embodiments can be modified by incorporating therein one or more features of the other embodiment or embodiments. Furthermore, at least certain features of each of the illustrated and described friction clutches are of a nature which renders them patentable per se, i.e., not only in combination with some of or all other elements of the respective friction clutch.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An engageable and disengageable friction clutch, comprising:

a housing rotatable about a predetermined axis;

a pressure plate;

means for non-rotatably connecting said pressure plate to said housing with limited freedom of movement in the direction of said axis;

a rotary counterpressure plate adjacent said pressure plate;

a torque transmitting clutch disc disposed between said plates and having friction linings engageable by and disengageable from at least one of said plates and being subject to wear as a result of repeated engagement with and disengagement from said at least one plate;

at least one actuating device and a resilient device disposed between said housing and said pressure plate to bias said pressure plate toward said counterpressure plate and to thereby clamp said friction linings between said plates and to rotate said clutch disc about said axis;

means for compensating for wear at least upon said friction linings, said compensating means being disposed between said pressure plate and one of said devices and being axially adjustable to a position corresponding to the extent of wear upon said friction linings; and means for arresting said compensating means in said position to limit an adjustment of said compensating means and to prevent an adjustment of said compensating means when there is no wear, said arresting means being provided on said pressure plate, said compensating means including a locating element that is axially moveable, due to a biasing force from said resilient device, so as to be in contact with said pressure plate, said arresting means being axially moveable with respect to said locating element.

2. The friction clutch of claim 1, wherein said resilient device comprises an axially stressed diaphragm spring and said housing comprises a ring-shaped seat tiltably mounting said diaphragm spring, said diaphragm spring including an annular portion engaging said seat and prongs extending substantially radially inwardly of said annular portion and forming part of said actuating device.

3. The friction clutch of claim 1, wherein said arresting means comprises at least one sensor having means for monitoring the extent of wear upon said friction linings, said monitoring means comprising a sensor element which is movable relative to said pressure plate into abutment with at least one axially fixed part of the clutch to thereby limit the extent of movability of said pressure plate away from said counterpressure plate.

4. The friction clutch of claim 3, wherein said sensor element is movable relative to said pressure plate in the direction of said axis and said arresting means further comprises means for automatically coupling said sensor element to an axially movable part of the clutch, said sensor element coming to a halt upon abutment against said at least one axially fixed part of the clutch.

5. The friction clutch of claim 4, wherein said at least one axially fixed part is one of said housing and said counterpressure plate and said at least one axially movable part is said pressure plate.

6. The friction clutch of claim 4, wherein said sensor element comprises a portion which cooperates with a portion of a locating element of said compensating means in response to disengagement of the clutch.

7. The friction clutch of claim 6, wherein said locating element is movable in the direction of said axis and further comprising means for adjustably mounting said locating element on said pressure plate.

8. The friction clutch of claim 1, wherein said compensating means comprises a locating element for said resilient device and an equalizing unit disposed between said locating element and said pressure plate, said equalizing unit being self-locking in response to engagement of the clutch and including means for automatically adjusting said locating element in dependency on wear upon said linings in response to disengagement of the clutch.

9. The friction clutch of claim 8, wherein said locating element is movable axially of and away from said pressure plate, said arresting means including means for preventing movements of said locating element axially of and toward said pressure plate.

10. The friction clutch of claim 1, wherein said compensating means includes means which, when the friction clutch is disengaged, make an automatic adjustment possible, but is self-locking during the engagement of the clutch.

11. The friction clutch of claim 1, wherein said compensating means comprises a substantially ring-shaped locating element.

12. The friction clutch of claim 11, wherein said compensating means further comprises ramps between said locating element and said pressure plate.

13. The friction clutch of claim 12, wherein said ramps include a first set adjacent said pressure plate and a complementary second set between said first set and said locating element.

14. The friction clutch of claim 13, wherein said compensating means further comprises means for biasing the ramps of one of said sets against the ramps of the other of said sets.

15. The friction clutch of claim 12, wherein said locating element has a substantially U-shaped cross-sectional outline and defines a substantially annular space for said ramps.

16. The friction clutch of claim 15, wherein said locating element contains a metallic sheet material and said ramps are distributed in said space in the circumferential direction of said locating element.

17. The friction clutch of claim 15, wherein said compensating means further comprises means for preventing turning of at least some of said ramps relative to said locating element.

18. The friction clutch of claim 15, wherein said locating element comprises means for axially movably confining at least some of said ramps in said space.

19. The friction clutch of claim 15, wherein said compensating means further comprises wedges, one for each of said ramps and each carrying the respective ramp, said wedges including a first set non-rotatably and axially movably mounted on said locating element and engaging said pressure plate and a second set between the wedges of said first set and said locating element, the wedges of said second set being movable in said space relative to said locating element to thereby effect an axial movement of the wedges of said first set and said locating element relative to each other.

20. The friction clutch of claim 19, wherein said compensating means further comprises means for preventing rotation of said locating element and said pressure plate relative to each other.

21. The friction clutch of claim 19, wherein said compensating means further comprises means for biasing each wedge of said second set against a discrete wedge of said first set.

22. The friction clutch of claim 21, wherein said biasing means comprises springs reacting against the wedges of said first set and bearing against the wedges of said second set.

23. The friction clutch of claim 22, wherein at least one of said springs includes a coil spring.

24. The friction clutch of claim 22, wherein said wedges have retainers for the respective springs.

25. The friction clutch of claim 24, wherein said springs include coil springs each having first and second end portions, said retainers including means for guiding at least the end portions of the respective springs.

26. The friction clutch of claim 19, wherein at least a portion of each wedge of said second set is disposed axially of said pressure plate between said locating element and one wedge of said first set.

27. The friction clutch of claim 12, wherein said compensating means further comprises wedges, one for each of said ramps and each carrying the respective ramp, at least some of said wedges containing a heat-resistant and heat-insulating material.

28. The friction clutch of claim 12, wherein said compensating means further comprises wedges, one for each of at least some of said ramps and each carrying the respective ramp, at least some of said wedges containing a heat-resistant material.

29. The friction clutch of claim 28, wherein said material is selected from the group consisting of thermoplastic and pressure setting plastic materials.

30. The friction clutch of claim 12, wherein said compensating means further comprises a wedge for each of said ramps and each carrying the respective ramp, said wedges including a first set movable axially and a second set movable circumferentially of said locating element, the wedges of said first set consisting of a material having a first coefficient of friction and the wedges of said second set consisting of a material having a different second coefficient of friction.

31. The friction clutch of claim 1, wherein said arresting means includes means for limiting the extent of axial movability of said pressure plate away from said counterpressure plate and toward said housing during disengagement of the clutch, said resilient device including a portion which bears upon said compensating means in engaged condition of the clutch and is movable axially of said pressure plate to a greater second extent in response to disengagement of the clutch.

32. The friction clutch of claim 31, wherein said compensating means is biased by said resilient device only in engaged condition of the clutch.

33. The friction clutch of claim 1, wherein said compensating means comprises a locating element which is biased by said resilient device in engaged condition of the clutch, a first set of wedges, a second set of wedges, one for each wedge of the first set and each engaging the respective wedge of the first set, and means for non-rotatably mounting the wedges of one of said sets on said pressure plate, said locating element and the wedges of the other of said sets being rotatable relative to said pressure plate.

34. The friction clutch of claim 1, wherein said rotary counterpressure plate is a flywheel.

35. An engageable and disengageable friction clutch, comprising:

a housing rotatable about a predetermined axis;

a pressure plate; means for non-rotatably connecting said pressure plate to said housing with limited freedom of movement in the direction of said axis;

an axially stressed diaphragm spring between said housing and said pressure plate; an annular seat tiltably mounting said diaphragm spring in said housing;

a counterpressure plate rotatable with said housing; a clutch disc having friction linings between said plates, said spring being arranged to bias said pressure plate and to thus clamp the friction linings between said plates in an engaged condition of the clutch and at least said linings being subject to wear as a result of engagement and disengagement of the clutch;

means for compensating for wear at least upon said linings, said compensating means being disposed between said pressure plate and said spring and including at least one locating element movable in the direction of said axis and biased by said spring; and arresting means including means for limiting and for maintaining at least substantially constant the extent of axial movability of said pressure plate away from said counterpressure plate, said limiting means operating between said pressure plate and at least one axially fixed part of the clutch, and including means for limiting the axial movability of said locating element relative to said pressure plate at least during disengagement of the clutch, said at least one locating element being axially moveable with respect to said pressure plate and with respect to said limiting means.

36. An engageable and disengageable friction clutch, comprising a housing rotatable about a predetermined axis; a pressure plate; means for non-rotatably connecting said pressure plate to said housing with limited freedom of movement in the direction of said axis; a rotary counterpressure plate adjacent said pressure plate; a torque transmitting clutch disc disposed between said plates and having friction linings engageable by and disengageable from at least one of said plates and being subject to wear as a result of repeated engagement with and disengagement from said at least one plate; at least one actuating device and a resilient device disposed between said housing and said pressure plate to bias said pressure plate toward said counterpressure plate and to thereby clamp said friction linings between said plates and to rotate said clutch disc about said axis; means for compensating for wear at least upon said friction linings, said compensating means being disposed between said pressure plate and one of said devices and being axially adjustable to a position corresponding to the extent of wear upon said friction linings; and means for arresting said compensating means in said position, said arresting means being provided on said pressure plate and comprise at least one sensor element, wherein said sensor element is movable relative to said pressure plate in the direction of said axis and said arresting means further comprises means for automatically coupling said sensor element to an axially movable part of the clutch, said sensor element coming to a halt upon abutment against at least one axially fixed part of the clutch, wherein said sensor element comprises a portion which cooperates with a portion of a locating element of said compensating means in response to disengagement of the clutch.

37. In an engageable and disengageable friction clutch, a combination comprising:

a pressure plate rotatable about and movable in the direction of a predetermined axis;

a diaphragm spring reacting against an axially fixed part of the clutch to bias said pressure plate axially in engaged condition of the clutch;

arresting means including means for limiting the extent of movability of said pressure plate toward said diaphragm spring in response to disengagement of the clutch, said diaphragm spring including a portion which at least indirectly bears upon said pressure plate in an engaged condition of the clutch and is movable axially of said pressure plate to a greater second extent in response to disengagement of the clutch, said limiting means being provided on said pressure plate; and a wear compensating unit being disposed between said pressure plate and said diaphragm spring, said unit being biased by said spring only in the engaged condition of the clutch, said limiting means comprises means which cooperates with a portion of a locating element of said compensating means in response to disengagement of the clutch, said means which cooperates with a portion of a locating element being axially moveable with respect to said locating element in dependence upon the wear of a friction lining in said friction clutch.

38. A friction clutch comprising:

a clutch housing being mounted on a flywheel, said clutch housing being rotatable about an axis of rotation;

a pressure plate being disposed in a rotatably fixed and axially moveable relationship with respect to said clutch housing, said pressure plate being supported over friction linings of a clutch disk adjacent to the flywheel;

a diaphragm spring having a preliminary tension, said diaphragm spring being supported between a support of the clutch housing and a support that is carried by said pressure plate;

an adjustment device being disposed in the supporting path of said diaphragm spring between said diaphragm spring and said pressure plate, said adjustment device having at least one moveable wear-path compensating member which, when said friction linings are worn and the friction clutch is disengaged, brings about an axial shift of said pressure plate away from said diaphragm spring;

at least one clearance provider being disposed at the pressure plate, said at least one clearance provider being guided so that said at least one clearance provider is axially moveable;

a holding means for arresting the axial movement of said at least one clearance provider with respect to said pressure plate;

at least a first stopping means which limits the axial movement of said at least one clearance provider in the direction toward said flywheel; and at least one second stopping means being provided at said at least one clearance provider and, relative to said pressure plate, limits the adjustment path of the wear-path compensating member as a function of the wear of said friction linings.

39. An engageable and disengageable friction clutch, comprising:

a housing rotatable about a predetermined axis; a pressure plate;

means for non-rotatably connecting said pressure plate to said housing with limited freedom of movement in the direction of said axis;

a rotary counterpressure plate adjacent said pressure plate;

a torque transmitting clutch disc disposed between said plates and having friction linings engageable by and disengageable from at least one of said plates and being subject to wear as a result of repeated engagement with and disengagement from said at least one plate;

at least one actuating device and a resilient device disposed between said housing and said pressure plate to bias said pressure plate toward said counterpressure plate and to thereby clamp said friction linings between said plates and to rotate said clutch disc about said axis;

means for compensating for wear at least upon said friction linings, said compensating means being disposed between said pressure plate and one of said devices and being axially adjustable to a position corresponding to the extent of wear upon said friction linings; and means for arresting said compensating means in said position, said arresting means being provided on said pressure plate and comprise at least one sensor element, said sensor element being movable relative to said pressure plate in the direction of said axis, said arresting means further comprising means for automatically coupling said sensor element to an axially movable part of the clutch, said sensor element coming to a halt upon abutment against at least one axially fixed part of the clutch.

40. An engageable and disengageable friction clutch as claimed in claim 39, wherein said sensor element comprises a portion which cooperates with a portion of a locating element of said compensating means in response to disengagement of the clutch.

41. An engageable and disengageable friction clutch for motor vehicles with automatic compensation for wear upon a clutch disc, comprising a flywheel rotatable about a predetermined axis; a pressure plate non-rotatably connectable with said flywheel and including a peripheral portion having at least one bore which is at least substantially parallel to said axis clutch disc having friction linings interposed between said flywheel and said pressure plate; a rotary housing at least partially confining said pressure plate, said housing being rotatable with said pressure plate and said pressure plate being movable relative to said housing in the direction of said axis; a prestressed diaphragm spring interposed between said housing and said pressure plate to urge the pressure plate against the friction linings in the engaged condition of the clutch with attendant wear at least upon said friction linings in response to repeated engagement and disengagement of the clutch, said spring having a radially inner portion and a radially outer portion, one of said inner and outer portions bearing upon said housing and the other of said inner and outer portions bearing upon a locating element at said pressure plate; an automatic equalizing unit disposed between said other portion of said spring and one of said pressure plate and said locating element and arranged to move said pressure plate in the direction of said axis away from said spring to thus compensate for wear at least upon said friction linings, said pressure plate and said locating element defining a clearance which widens in the direction of said axis in response to progressing wear at least upon said friction linings; a sleeve in said at least one bore; at least one sensor member having a substantially radially inwardly extending portion at least indirectly bearing upon a portion of said equalizing unit, said at least one sensor member further having a second portion movable in the general direction of said axis and said at least one sensor member being in frictional engagement with said sleeve; and a stop provided on said housing to limit the movements of said at least one sensor member relative to said pressure plate in a direction toward said flywheel, said equalizing unit being operative to fill said clearance during disengagement of the clutch following said progressing wear.

42. An engageable and disengageable friction clutch for motor vehicles with automatic compensation for wear upon a rotary clutch disc, comprising a flywheel rotatable about a predetermined axis; a pressure plate non-rotatably connectable with said flywheel and including a peripheral portion having openings at least substantially parallel to said axis and spaced apart from each other in a circumferential direction of said pressure plate, said clutch disc having friction linings interposed between said flywheel and said pressure plate; a rotary housing at least partially confining said pressure plate, said housing being rotatable with said pressure plate and said pressure plate being movable relative to said housing in the direction of said axis; a prestressed diaphragm spring interposed between said housing and said pressure plate to urge the pressure plate against said friction linings in the engaged condition of the clutch with attendant wear at least upon said friction linings in response to repeated engagement and disengagement of the clutch, said spring having a radially inner portion and a radially outer portion, one of said inner and outer portions bearing upon said housing and the other of said inner and outer portions bearing upon a locating element at said pressure plate; an automatic equalizing unit disposed between said other portion of said spring and one of said pressure plate and said locating element and arranged to move said pressure plate in the direction of said axis away from said spring to thus compensate for wear at least upon said friction linings, said pressure plate and said locating element defining a clearance which widens in the direction of said axis in response to progressing wear at least upon said friction linings; a sensor element longitudinally movably received in each of said openings at least substantially without play and being in at least indirect frictional engagement with said pressure plate, each of said sensor members having a substantially radially inwardly extending portion at least indirectly bearing upon a portion of said equalizing unit; and at least one stop provided at said housing to limit the movements of said sensor members relative to said pressure plate in a direction toward said flywheel, said equalizing unit being operative to fill said clearance during disengagement of the clutch following said progressing wear.

43. An engageable and disengageable friction clutch comprising a flywheel rotatable about a predetermined axis; a housing connectable with said flywheel; a pressure plate rotatable with said flywheel, disposed between said flywheel and said housing and movable in the direction of said axis; a clutch disc having friction linings disposed between said flywheel and said pressure plate and being subject to wear in response to repeated engagement and disengagement of the clutch with attendant axial movement of said pressure plate away from a prestressed diaphragm spring, said spring being interposed between a seat at said housing and a locating element carried by said pressure plate; and a wear compensating unit disposed between said pressure plate and said spring and comprising at least one mobile displacing member arranged to compensate for said axial movement of said pressure plate while the clutch is disengaged, said unit further comprising at least one sensor member provided at said pressure plate and movable in at least substantial parallelism with said axis, and arresting means including means for opposing axial movements of said sensor member relative to said pressure plate, said unit also comprising at least one first stop arranged to limit the extent of movability of said at least one sensor member toward said flywheel and at least one second stop provided on said at least one sensor member and arranged to limit the extent of movement of said at least one displacing member relative to said pressure plate as a function of the extent of wear at least upon said friction linings.

44. An engageable and disengageable friction clutch for motor vehicles with automatic compensation for wear upon a clutch disc, comprising a flywheel rotatable about a predetermined axis; a pressure plate non-rotatably connectable with said flywheel and including a peripheral portion having at least one bore which is at least substantially parallel to said axis, said clutch disc having friction linings interposed between said flywheel and said pressure plate; a rotary housing at least partially confining said pressure plate, said housing being rotatable with said pressure plate and said pressure plate being movable relative to said housing in the direction of said axis; a prestressed diaphragm spring interposed between said housing and said pressure plate to urge the pressure plate against the friction linings in the engaged condition of the clutch with attendant wear at least upon said friction linings in response to repeated engagement and disengagement of the clutch, said spring having a radially inner portion and a radially outer portion, one of said inner and outer portions bearing upon said housing and the other of said inner and outer portions bearing upon a locating element at said pressure plate; an automatic equalizing unit disposed between said other portion of said spring and one of said pressure plate and said locating element and arranged to move said pressure plate in the direction of said axis away from said spring to thus compensate for wear at least upon said friction linings, said pressure plate and said locating element defining a clearance which widens in the direction of said axis in response to progressing wear at least upon said friction linings; a sleeve in said at least one bore; at least one sensor member having a substantially radially inwardly extending portion at least indirectly bearing upon a portion of said equalizing unit, said at least one sensor member further having a second portion movable in the general direction of said axis and said at least one sensor member being in frictional engagement with said sleeve; and a stop provided on said housing to limit the movements of said at least one sensor member relative to said pressure plate in a direction toward said flywheel, said equalizing unit being operative to fill said clearance during disengagement of the clutch following said progressing wear and to thus compensate for the widening of said clearance.

45. An engageable and disengageable friction clutch for motor vehicles with automatic compensation for wear upon a rotary clutch disc, comprising a flywheel rotatable about a predetermined axis; a pressure plate non-rotatably connectable with said flywheel and including a peripheral portion having openings at least substantially parallel to said axis and spaced apart from each other in a circumferential direction of said pressure plate, said clutch disc having friction linings interposed between said flywheel and said pressure plate; a rotary housing at least partially confining said pressure plate, said housing being rotatable with said pressure plate and said pressure plate being movable relative to said housing in the direction of said axis; a prestressed diaphragm spring interposed between said housing and said pressure plate to urge the pressure plate against said friction linings in the engaged condition of the clutch with attendant wear at least upon said friction linings in response to repeated engagement and disengagement of the clutch, said spring having a radially inner portion and a radially outer portion, one of said inner and outer portions bearing upon said housing and the other of said inner and outer portions bearing upon a locating element at said pressure plate; an automatic equalizing unit disposed between said other portion of said spring and one of said pressure plate and said locating element and arranged to move said pressure plate in the direction of said axis away from said spring to thus compensate for wear at least upon said friction linings, said pressure plate and said locating element defining a clearance which widens in the direction of said axis in response to progressing wear at least upon said friction linings; a sensor element longitudinally movably received in each of said openings at least substantially without play and being in at least indirect frictional engagement with said pressure plate, each of said sensor members having a substantially radially inwardly extending portion at least indirectly bearing upon a portion of said equalizing unit; and at least one stop provided at said housing to limit the movements of said sensor members relative to said pressure plate in a direction toward said flywheel, said equalizing unit being operative to fill said clearance during disengagement of the clutch following said progressing wear to thus compensate for the widening of said clearance.

* * * * *